(12) United States Patent
Clark et al.

(10) Patent No.: US 7,555,279 B2
(45) Date of Patent: Jun. 30, 2009

(54) SYSTEMS AND METHODS FOR DC OFFSET CORRECTION IN A DIRECT CONVERSION RF RECEIVER

(75) Inventors: William Clark, Gilbert, AZ (US); Kelly Don Anderson, Gilbert, AZ (US); John Paul Sharrit, Fountain Hills, AZ (US)

(73) Assignee: General Dynamics C4 Systems, Scottsdale, AZ (US)

( * ) Notice: Subject to any disclaimer, the term of this patent is extended or adjusted under 35 U.S.C. 154(b) by 444 days.

(21) Appl. No.: 11/491,228

(22) Filed: Jul. 24, 2006

(65) Prior Publication Data

US 2008/0032660 A1 Feb. 7, 2008

(51) Int. Cl.
*H04B 1/10* (2006.01)

(52) U.S. Cl. .................................. 455/311; 455/324

(58) Field of Classification Search .................. 455/280, 455/293, 296, 311, 312, 323, 324; 375/346, 375/349

See application file for complete search history.

(56) References Cited

U.S. PATENT DOCUMENTS

| 5,241,702 | A * | 8/1993 | Dent ..................... 455/278.1 |
| 6,882,834 | B1 | 4/2005 | Balboni |
| 6,985,711 | B2 | 1/2006 | Holenstein et al. |
| 6,995,595 | B2 | 2/2006 | Kim |

* cited by examiner

*Primary Examiner*—Nguyen Vo
(74) *Attorney, Agent, or Firm*—Hunton & Williams LLP

(57) ABSTRACT

Systems and methods for DC offset correction in analog and digital direct conversion RF receivers. A time derivate and subsequent integration of in-phase and quadrature phase signal path components is performed to effectively remove DC offset from the resultant down converted baseband signal.

14 Claims, 6 Drawing Sheets

PRIOR ART

FIGURE 3
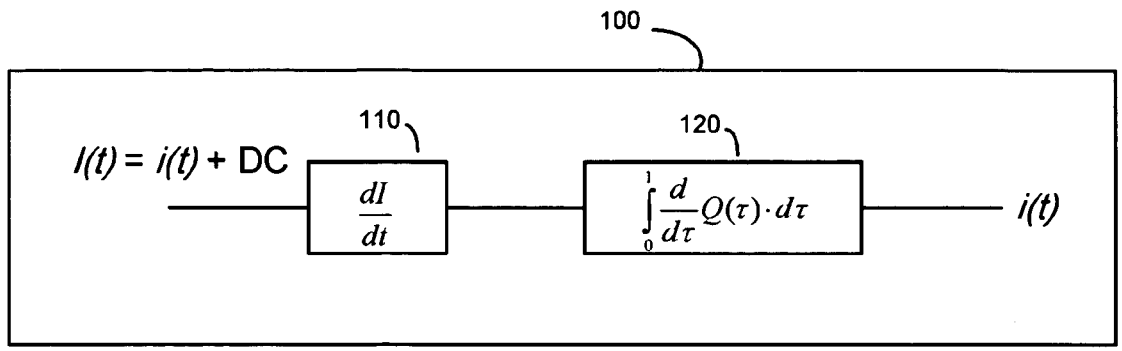
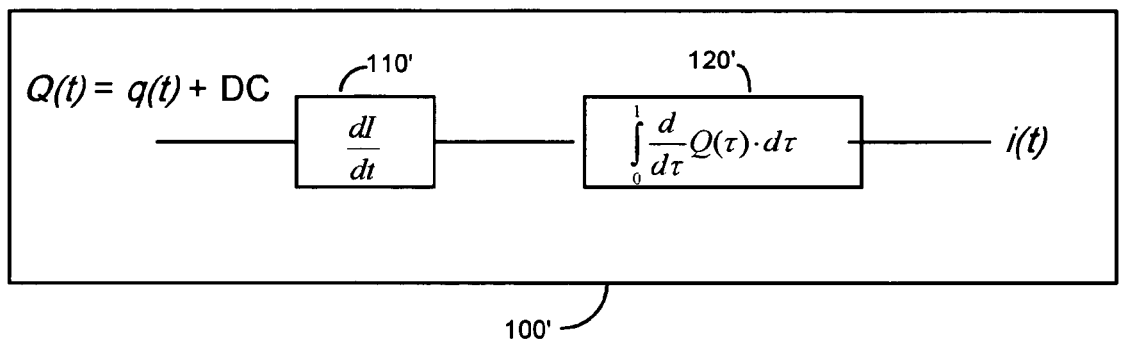
FIGURE 4
(112) $\quad y_i = x_i - x_{i-1}$
(122) $\quad z_i = y_i + K \cdot T \cdot Z_{i-1}$

SYSTEMS AND METHODS FOR DC OFFSET CORRECTION IN A DIRECT CONVERSION RF RECEIVER

GOVERNMENT LICENSE RIGHTS

This invention was made with Government support under contract N00039-98-D-0029 awarded by the U.S. Department of the Navy, Space and Naval Warfare Systems Command. The Government has certain rights in this invention.

FIELD OF THE INVENTION

The present invention relates to radio frequency (RF) communication systems and more particularly to DC offset correction techniques in analog and digital direct conversion receivers.

BACKGROUND OF THE INVENTION

Homodyne, or direct conversion receivers are known in the art. As the name implies, direct conversion receivers directly convert an incoming radio frequency (RF) signal into its baseband in-phase and quadrature components without any intermediate translation into an intermediate frequency (IF) signal.

Conventional methods of down converting an RF signal to baseband require two conversion steps. The RF signal is first down converted to an intermediate frequency (IF) signal. Then, the IF signal is down converted to a baseband signal. In a mobile telecommunications environment, this can require multiple chips and other circuits including combinations of elements such as a radio frequency receiver (RFR) chip, an intermediate frequency receiver (IFR) chip, a baseband receiver chip, and other associated surrounding chips such as intermediate filters, mixers and amplifiers. Alternatively, this can require a single receiver chip with both RF and IF circuits and a separate IF filter chip. In either topology, all of these RF circuit components are expensive for manufacturers of small, low cost mobile communication devices such as cellular phones, pagers, cordless phones, two-way radios, etc. Therefore, heterodyne receivers are less than ideal for these applications.

Direct conversion receivers work by translating RF signals directly into base band using a local oscillator (LO) having a frequency exactly matched to the frequency of the received RF signal to demodulate the RF signal. This can be performed in either the analog or digital domain. An incoming signal g(t) is received at the RF input of the direct conversion receiver and then passed through a preselect filter and a low-noise amplifier (LNA). The preselect filter is simply a band pass filter designed to pass the desired signal g(t) and to reject spurious out-of-band signals. The bandwidth of the preselect filter is much greater than the bandwidth of the desired signal. Thus, the preselect filter is a coarse filter and may pass unwanted signals in addition to the desired signal.

After passing through the preselect filter, the signal g(t) is split and each split portion is sent through a mixer circuit. In one mixer circuit, the signal g(t) is mixed with a sinusoid generated by the LO and tuned to the same frequency as the carrier frequency. In the other mixer, the signal g(t) is mixed with the same sinusoid but with a phase change of $\pi/2$ radians (90 degrees). The two mixers produce the in-phase and quadrature (I and Q) components of the desired signal g(t) centered at the baseband and at twice the carrier frequency. The high frequency components are eliminated by the low pass filters and the in-phase and quadrature signals are finally amplified.

Direct conversion enables the direct conversion of RF signals to baseband signals in a single step—that is without intermediate frequency signals. Thus, direct conversion eliminates the need for the RF to IF conversion step, and thus, the IF filter chip or other IF circuitry. This is a significant cost savings for device manufacturers and the simplified down conversion process also reduces power consumption thereby enhancing the performance of devices containing the receiver circuitry.

Direct conversion can also be used within a heterodyne receiver as the final conversion from an IF frequency directly to baseband. This provides low frequency baseband signals for easier and lower power analog-to-digital conversion and subsequent demodulation.

Despite the benefit of direct conversion over conventional methods of down converting, direct conversion suffers from some problems as well. It is well known in the art that direct conversion receivers suffer from constant voltage or direct current (DC) voltage offsets. Unwanted DC offsets include static DC levels as well as time varying DC levels. DC offsets can arise from the receiver's local oscillator (LO) self-mixing (due to leakage and re-radiation), $2^{nd}$ order effects of strong in-band interfering signals, circuit mismatch and interferer self-mixing, each of which can vary with gain setting, frequency, fading and temperature. The DC offset can result in loss of or degradation in receiver sensitivity, selectivity, dynamic range, and analog and digital response times. As a result of these effects, if not cancelled, DC offset degrades signal quality, limits dynamic range through ADC saturation, and increases power consumption.

One method of eliminating DC has been through the use of filtering. In practical application, filtering is a less than ideal solution to the DC offset problem. Filtering suffers from slow response times due to narrow bandwidths and possible loss of portions of the desired signal.

Other problems and drawbacks exist with DC offset correction methods in direct conversion receivers.

SUMMARY OF THE INVENTION

In view of the above noted shortcomings of known DC offset correction techniques, at least one embodiment of the invention provides a direct conversion RF receiver. The direct conversion RF receiver according to this embodiment comprises an RF antenna adapted to receive an RF signal, a preselect filter adapted to filter the incoming RF signal, a low noise amplifier adapted to amplify the received RF signal, a local oscillator producing a local oscillation signal having a frequency tuned to that of the received RF signal, a first RF mixer along an in-phase channel path adapted to multiply a received radio frequency signal with the local oscillation signal, a second RF mixer along a quadrature-phase channel path adapted to multiply the received radio frequency signal with a 90° phase-shifted version of the local oscillation signal, a first low pass filter filtering an output of the first mixer thereby outputting a downconverted in-phase signal I, centered at baseband, a second low pass filter filtering an output of the second mixer thereby outputting a downconverted quadrature phase signal Q centered at baseband, and a DC correction circuit adapted to perform a time derivative and subsequent integration of the I and Q signals.

Another embodiment according to this invention provides a method of reducing direct current offset in a direct conversion receiver. The method of reducing direct current offset in a direct conversion receiver according to this embodiment comprises receiving an RF signal at the receiver, subjecting the RF signal to a preselect filtering process, splitting the resultant signal into parallel in-phase (I), and quadrature-phase (Q) signal paths, demodulating the respective signals on the I and Q signal paths with mixers located on each signal path and connected to a local oscillator, filtering the respective results of the demodulation with a low pass filter to yield downconverted I and Q components of the received RF signal, taking a time derivative of each of the respective downconverted signals, and integrating the results of each time derivative.

In an additional embodiment of the invention, a method of canceling DC offset in an RF receiver having a direct converter for direct down conversion of a received RF signal to a baseband signal is provided. The method according to this embodiment comprises taking a time derivative of a signals in respective in-phase and quadrature-phase signal paths of the direct converter, and integrating the results of the derivative to obtain the received signal without any constant offset value.

A further embodiments of the invention provides a method of canceling DC offset in an IF direct converter for direct down conversion of a received IF signal to a baseband signal is provided. The method according to this embodiment comprises taking a time derivative of a signals in respective in-phase and quadrature-phase signal paths of the direct converter, and integrating the results of the derivative to obtain the received signal without any constant offset value.

Yet another embodiment of the invention provides a DC offset reduction block for a direct conversion circuit of an RF receiver. The DC offset reduction block according to this embodiment comprises circuitry adapted to take a time derivative of respective signals propagating through in-phase and quadrature phase signal paths of the direct conversion circuit, and circuitry adapted to integrate the results of the differentiation, thereby yielding respective I and Q components devoid of constant offset values.

Still a further embodiment of the invention provides a direct conversion IF converter. The direct conversion IF converter according to this embodiment comprises an intermediate frequency, IF, filter adapted to filter the IF signal, an IF amplifier adapted to amplify the IF signal, a local oscillator producing a local oscillation signal having a frequency tuned to that of the IF signal, a first IF mixer along an in-phase channel path adapted to multiply a received radio frequency signal with the local oscillation signal, a second IF mixer along a quadrature-phase channel path adapted to multiply the received radio frequency signal with a 90° phase-shifted version of the local oscillation signal, a first low pass filter filtering an output of the first mixer thereby outputting a downconverted in-phase signal I, centered at baseband, a second low pass filter filtering an output of the second mixer thereby outputting a downconverted quadrature phase signal Q centered at baseband, and a residual DC correction circuit adapted to perform a time derivative and subsequent integration of the I and Q signals.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

FIG. 3 is a block diagram illustrating the DC offset eliminating module shown in FIG. 2 in greater detail;

FIG. 4 cites a pair of algebraic expressions for implementing DC offset correction in a direct conversion receiver or direct conversion IF converter according to various embodiments of the invention;

DETAILED DESCRIPTION

The following description is intended to convey a thorough understanding of the embodiments described by providing a number of specific embodiments and details involving DC offset correction in both analog and digital direct conversion RF receivers. It should be appreciated, however, that the present invention is not limited to the specific embodiments and details described herein, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
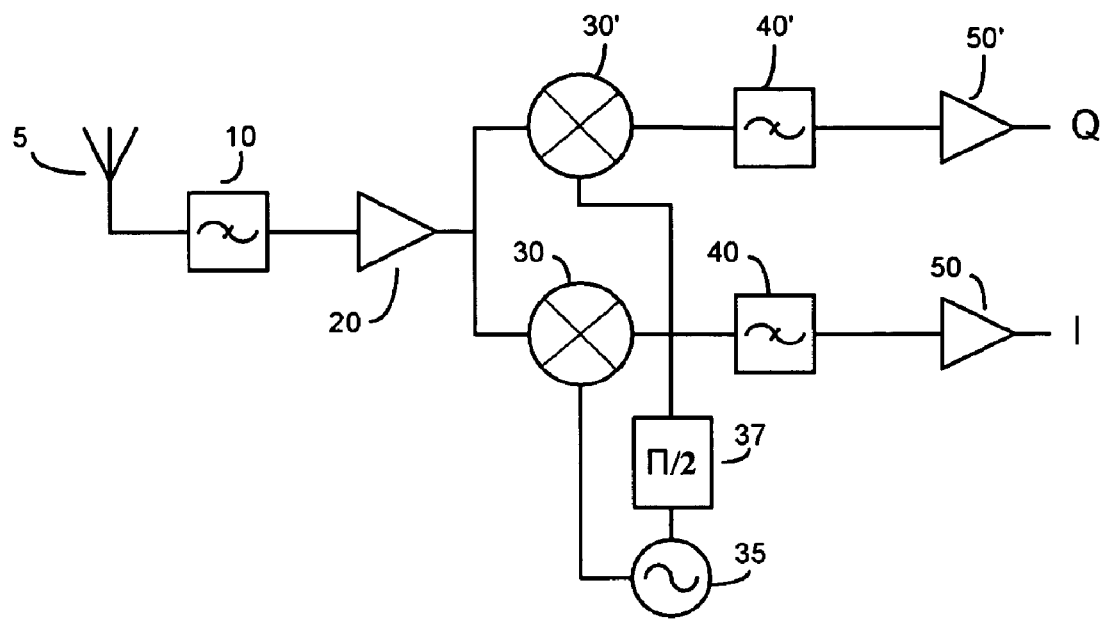
FIG. 1 is a block circuit diagram illustrating an exemplary topology of a conventional direct conversion RF receiver or direct conversion IF converter.

Referring now to FIG. 1, a block circuit diagram illustrating an exemplary topology of a conventional direct conversion RF receiver is depicted. The receiver circuit of FIG. 1 begins with an RF antenna portion 5 for receiving an incoming RF signal. RF Signals received by the antenna 5 are passed along a signal path to a preselect filter 10. The preselect filter 10 is typically implemented as a bandpass filter with a bandwidth much larger than the desired signal's bandwidth, thereby only rejecting the most spurious out-of-band signals. Next, a low noise amplifier (LNA) 20 amplifies the incoming RF signal, which is split into parallel in-phase and quadrature-phase signal paths. The two parallel signal paths consist of mixers 30, 30', which mix the received signal with a signal generated by a local oscillator (LO) 40, with the quadrature-phase signal path receiving a π/2 phase shifted version of the same sinusoidal LO signal. The lower mixer 30 multiplies the in-phase (I) component from the LNA 20 by the local frequency signal Cos ($\omega_{LO}t$). The upper mixer 30' multiples the quadrature phase (q) component from the LNA 20 by the 90° phase-shifted local oscillator 40 frequency signal. The first low pass filter (LPF) 40 filters the output of the first mixer 30 and output a down-converted in-phase signal I. The second LPF 40' filters the output of the second mixer 30' and outputs a down-converted quadrature phase signal Q. Thus, as a result of this configuration, RF signals are down-converted directly to baseband without requiring separate intermediate stage circuitry. It should be appreciated that FIG. 1 could also depict an IF filter (rather than a preselect filter) and an IF amplifier (rather than a low noise amplifier), both of which are also used in for a direct conversion IF converter.

As noted above, one of the problems with direct conversion is that it results in relatively high direct current (DC) offset levels in the resultant baseband signal. If these DC offsets are not cancelled, they can degrade signal quality, limit dynamic range through saturation and increase power consumption; these effects reduce receiver performance.

Figure 2:
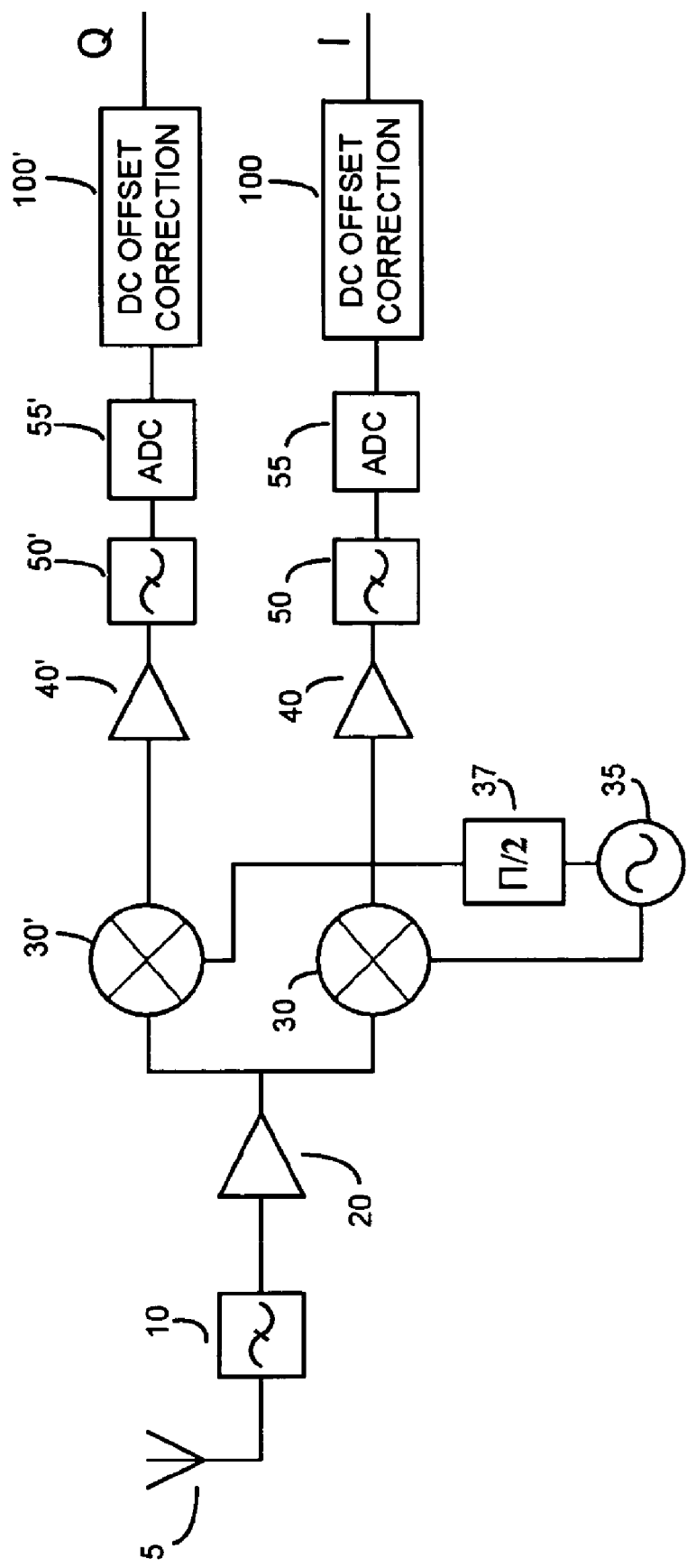
FIG. 2 is a block circuit diagram illustrating an exemplary topology of a direct conversion RF receiver or direct conversion IF converter for having a DC offset eliminating module for eliminating DC offset in the I and Q baseband portions of the circuit according to various embodiments of the present invention.

In view of this DC offset problem, various embodiments of the invention provide a novel, mathematical-based approach to canceling DC offset. Referring now to FIG. 2, a block circuit diagram illustrating an exemplary topology of a direct conversion RF receiver with a DC offset correction module for eliminating. DC offset of a digitized RF signal according to various embodiments of the present invention is provided. It should be appreciated that although in the embodiment shown in FIG. 2, DC offset correction is performed in the digital domain, that is after analog-to-digital conversion (ADC), in various other embodiments, DC offset correction may be performed using analog circuitry in the analog domain, that is prior to ADC. Also, in various embodiments, the DC offset correction module may be located in an IF filter circuit of a direct conversion IF converter.

With continued reference to FIG. 2, the receiver circuit is similar to that of the conventional receiver circuit of FIG. 1 in that it includes a signal path starting with an antenna 5, preselect filter 10 and LNA 20. The signal path splits the signal into I and Q paths where the respective signals are subject to local oscillator mixing with mixers 30 and 30', amplifiers 40 and 40', LPFs 50 and 50', ADCs 55 and 55'. However, the receiver circuit of FIG. 2 differs from the conventional direct conversion receiver by the inclusion of DC offset correction blocks 100 and 100' which reduce and ideally remove the DC offset from the signals in the I and Q circuits. As noted above, in the exemplary embodiment illustrated in FIG. 2, these blocks depict a digital DC offset correction process as evidenced by their location after ADC blocks 55 and 55'. In various embodiments, the DC offset correction blocks 100, 100' may be located in the analog domain and implemented using analog circuit techniques.

FIG. 3 illustrates the digital DC offset correction module 100 shown in FIG. 2 in greater detail. The incoming digital signal split into respective I(t) and Q(t) signal paths is subject to time differentiation and integration. Differentiation blocks 110 and 110' perform a time differentiation on the incoming signal. In a digital implementation, that is after analog to digital conversion, this may be represented algebraically as expression 112 in FIG. 4: $y_i = x_i - x_{i-1}$, or, in other words, the current rate of change of $y_i$, where $x_i$ is the value of the sample stream. Next, the DC offset correction block subjects the results of the respective time derivatives, $y_i$ and $y_i'$ to an integration to return the original signal less any DC constants. The integration step may be represented algebraically as $z_i = y_i + K \cdot T_s \cdot z_{i-1}$, where K is a gain constant and $T_s$ is the sample time interval. It should be appreciated that the $K \cdot T_s$ may be varied to achieve a desired response time. In one digital application, the inventors of this application found a $K \cdot T_s$ value of 0.995 worked well. Thus, in the first expression the sample stream is differentiated to eliminate any constant offset. The second expression integrates the resultant sample stream $y_i$ after differentiation to recover the original signal $z_i$ less the constant offset.

It should be appreciated that the DC offset correction modules 100, 100' of FIG. 3 are generic structures and may be utilized with any analog or digital direct conversion receiver. Moreover, they may be inserted at different locations in a direct conversion receiver than that illustrated in FIG. 2. For example, they can be applied in analog circuitry, in parallel with digital IQ gain and phase-correction circuits, or in advance of digital demodulation and detection algorithms.

Figure 5:
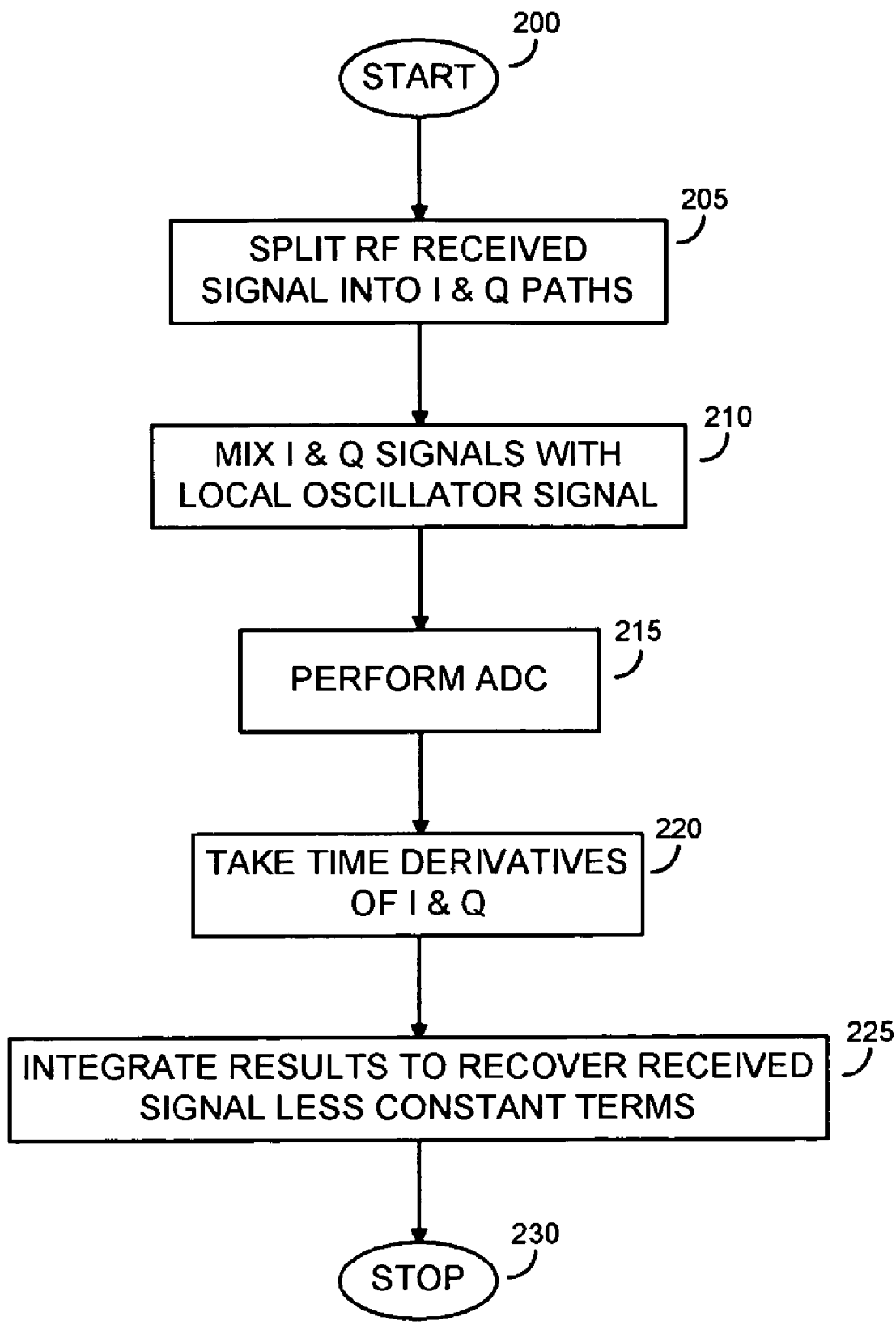
FIG. 5 is a flow chart outlining the steps of a method for performing DC offset correction in a direct conversion receiver or direct conversion IF converter according to at least one embodiment of the invention.

FIG. 5 is a flow chart outlining the steps of a method for performing DC offset correction in a direct conversion receiver according to at least one embodiment of the invention. The method begins in block 200 and proceeds to block 205 where the incoming RF signal is split into respective in-phase (I) and quadrature phase (Q) signal paths. Then, in block 210, analog mixing is performed on the signals on the respective I and Q paths using a local oscillator tuned to the frequency of the incoming RF signal followed by baseband amplification and filtering. As noted above, the Q path mixer receives a 90 degree phase shifted version of the LO signal. Then, in block 215 analog-to-digital conversion (ADC) is performed. Next, in block 220, DC offset correction begins following digitization by taking a time derivative of the respective I and Q path signals. Then, in block 225, the results of the differentiation are integrated to recover the original signals less any constant offsets. The method ends in block 230, where standard techniques may be utilized to recover the baseband signal.

Figure 6:
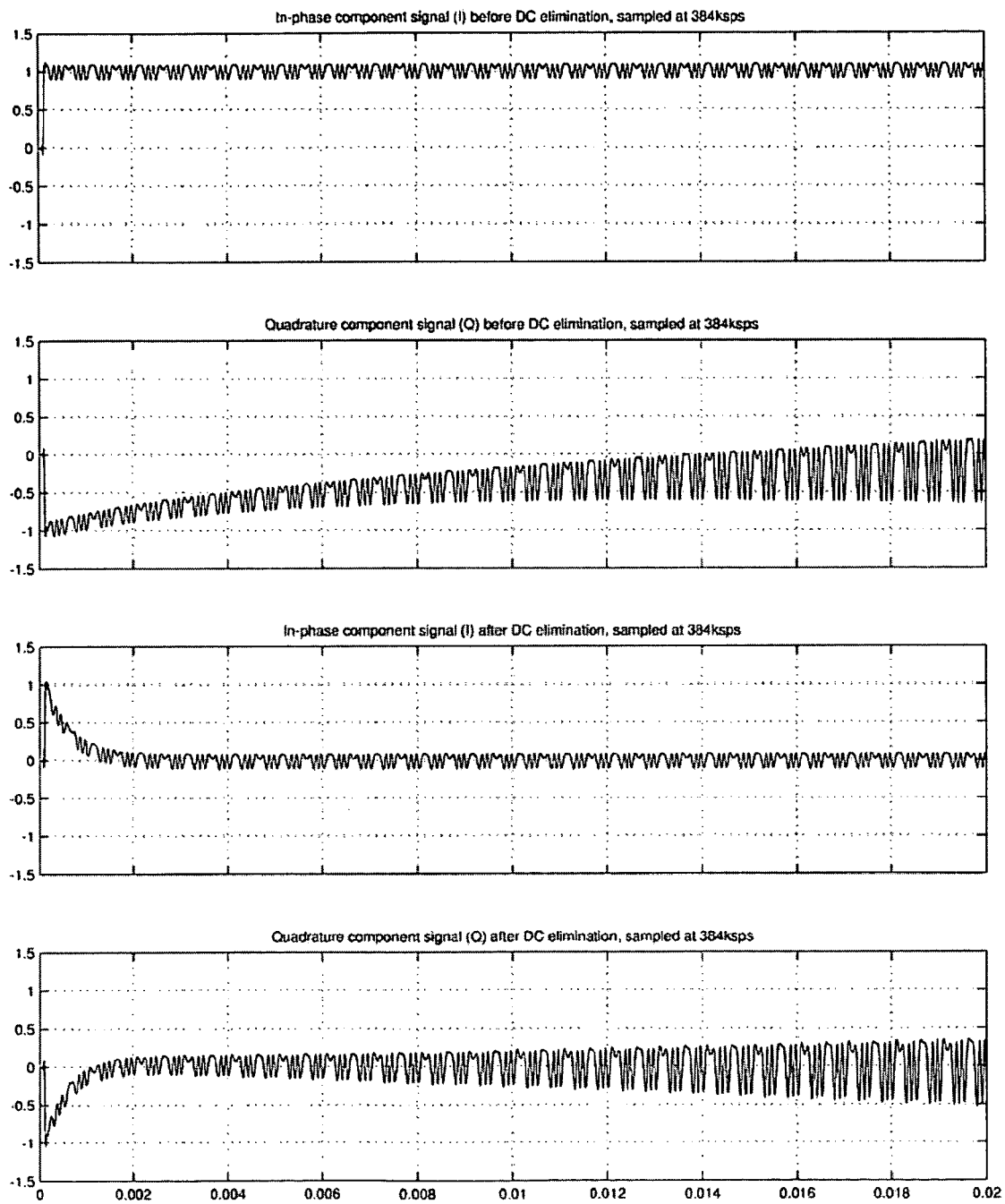
FIG. 6 is a simulation result illustrating in-phase and quadrature phase components of a received RF signal in a conventional direct conversion receiver as shown in FIG. 1, and in-phase and quadrature phase components of the same RF signal in a direct conversion receiver employing DC offset correction according to various embodiments of the invention, such as that depicted in FIG. 2.

Referring now to FIG. 6, a simulation result illustrating in-phase and quadrature phase components of a received RF signal after being processed with a conventional direct conversion receiver and a direct conversion receiver employing DC offset correction in accordance with various embodiments of the invention is shown.

The first sub-graph of FIG. 6, graph 6A shows an in-phase component signal (I) before DC offset correction is performed. The graph shows a relatively constant amplitude signal I. Sub-graph 6C shows the same in-phase component signal (I) after DC offset correction according to various embodiments of the invention has been performed. Sub-graph 6C shows that the (I) signal of 6A suffers from a significant DC offset that will effect the receiver performance and ultimately the accuracy of the baseband signal. Likewise, sub-graph 6B illustrates the quadrature phase signal component (Q) prior to DC offset correction. Sub-graph 6D shows the same quadrature phase signal component (Q) after DC offset correction using the techniques corresponding to one or more of the various embodiments of the invention has been performed. Sub-graph 6D shows that the DC offset skewed the resultant Q signal in the conventional direct conversion receiver results of 6B below the transverse axis across the time sample.

Figure 7:
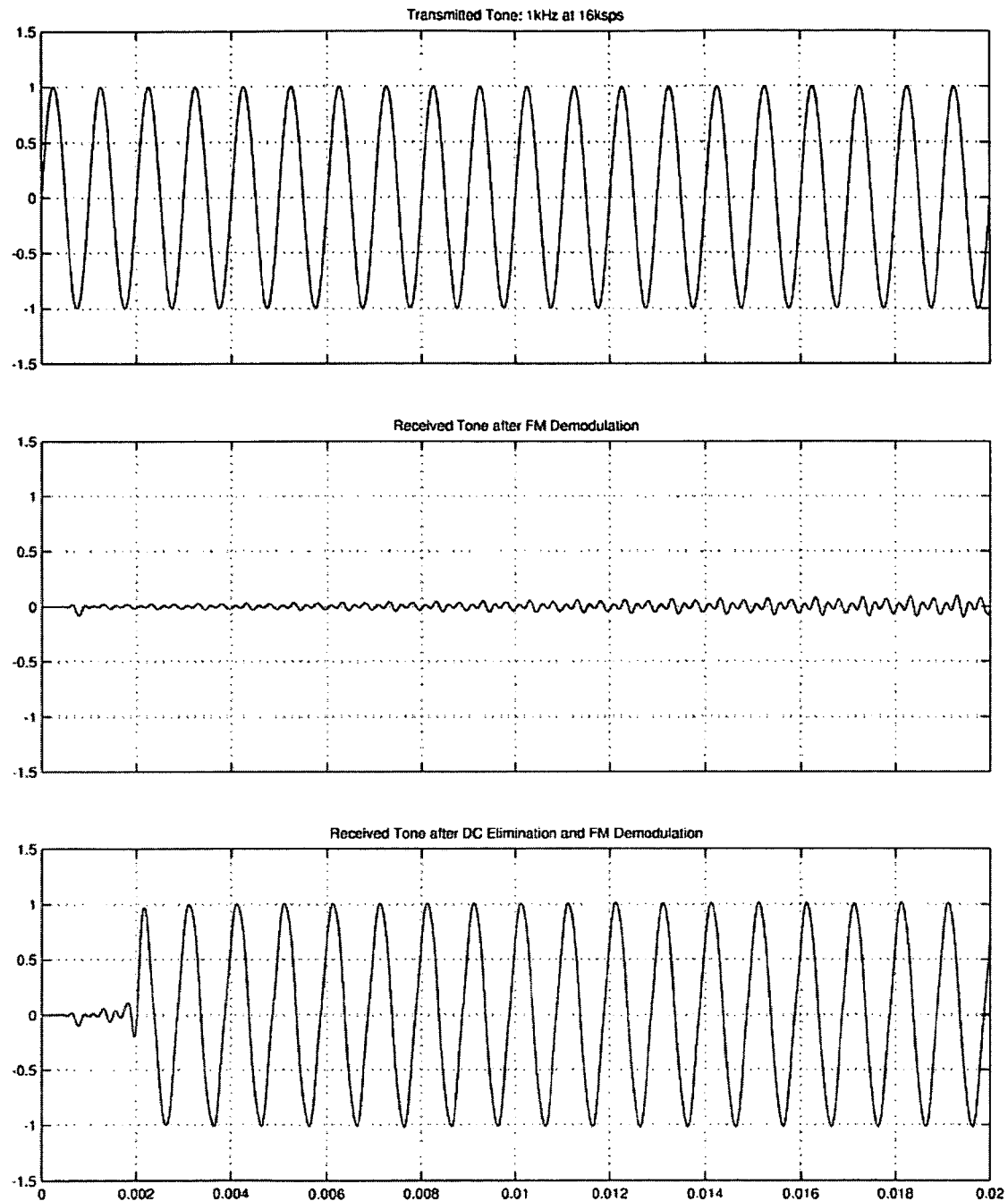
FIG. 7 is a simulation result illustrating a target baseband signal, the received, demodulated signal after processing with a conventional direct conversion receiver, such as that depicted in FIG. 1, and after processing with a direct conversion receiver employing DC offset correction according to various embodiments of the invention, such as that depicted in FIG. 2.

Referring now to FIG. 7, a simulation result illustrating a target baseband signal, the received, demodulated signal after processing with a conventional direct conversion receiver, and after processing with a direct conversion receiver employing DC offset correction using the techniques associated with one or more embodiments of the present invention.

In FIG. 7, the transmitted tone shown in sub-graph 7A is a baseband 1 kHz sinusoid-signal used to frequency modulate the RF carrier in a direct-conversion receiver. Since frequency modulation (FM) encodes baseband information in the RF signal's zero crossings, any DC offset will affect the quality of the demodulated baseband signal. In cases where the DC offset exceeds the amplitude of the I and Q signal components, the zero crossings and consequently the baseband signal is completely lost, as shown in sub-graph 7B. Sub-graph 7C shows the results when the same demodulation process is performed on the same received signal after DC offset correction using the techniques associated with one or more embodiments of the invention is performed. As seen in sub-graph 7C, the resultant waveform is a high fidelity reproduction of the transmitted tone shown in sub-graph 7A with identical amplitude and period.

Thus, as seen from the simulation results, the DC offset correction techniques described herein in accordance with the various embodiments of the invention reduce and ideally eliminate the effects of DC, and therefore the need for costly programmable analog and/or digital high pass filters that directly affect receiver size, weight, power consumption and costs. The DC elimination techniques disclosed herein may be implemented at the circuit level in a variety of different manifestations including, as part of a demodulation algorithm, just prior to demodulation, in programmable logic (PLA, FPGA, etc.) or in analog circuitry with little impact on existing direct conversion receiver designs and minimal additional power consumption.

The embodiments of the present inventions are not to be limited in scope by the specific embodiments described herein. For example, although many of the embodiments disclosed herein have been described in the context of a direct conversion receiver having a DC offset correction function, other embodiments, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Many modifications to the embodiments described above can be made without departing from the spirit and scope of the invention. Accordingly, the claims set forth below should be construed in view of the full breath and spirit of the embodiments of the present inventions as disclosed herein. Also, while the foregoing description includes many details and specificities, it is to be understood that these have been included for purposes of explanation only, and are not to be interpreted as limitations of the present invention.

The invention claimed is:

1. A direct conversion RF receiver comprising:
an RF antenna adapted to receive an RF signal;
a preselect filter adapted to filter the incoming RF signal;
a low noise amplifier adapted to amplify the received RF signal;
a local oscillator producing a local oscillation signal having a frequency tuned to that of the received RF signal;
a first RF mixer along an in-phase channel path adapted to multiply a received radio frequency signal with the local oscillation signal;
a second RF mixer along a quadrature-phase channel path adapted to multiply the received radio frequency signal with a 90° phase-shifted version of the local oscillation signal;
a first low pass filter filtering an output of the first mixer thereby outputting a downconverted in-phase signal I, centered at baseband;
a second low pass filter filtering an output of the second mixer thereby outputting a downconverted quadrature phase signal Q centered at baseband; and
a residual DC correction circuit adapted to perform a time derivative and subsequent integration of the I and Q signals, wherein the time derivative and subsequent integration comprise solving the following algebraic expressions:

$$Y_i = X_i - X_{i-1},$$

$$Z_i = Y_i + K \cdot T_s \cdot Z_{i-1}$$

where K is a gain constant, $T_s$ is the sample time interval, $X_i$ is the signal stream, and $Z_i$ is the original signal less any constant terms.

2. The direct conversion receiver according to claim 1, wherein the constant $K \cdot T_s$ is in the range of 0.9 to 1.

3. The direct conversion receiver according to claim 1, wherein the DC correction circuit comprises programmable logic adapted to perform a DC correction algorithm.

4. The direct conversion receiver according to claim 1, wherein the DC correction circuit comprises a set of mathematical operations performed on a processor.

5. A method of reducing direct current offset in a direct conversion receiver comprising:
receiving an RF signal at the receiver;
subjecting the RF signal to a preselect filtering process;
splitting the resultant signal into parallel in-phase (I), and quadrature-phase (Q) signal paths;
demodulating the respective signals on the I and Q signal paths with mixers located on each signal path and connected to a local oscillator;
filtering the respective results of the demodulation with a low pass filter to yield downconverted I and Q components of the received RF signal;
taking a time derivative of each of the respective downconverted signals; and
integrating the results of each time derivative, wherein taking a time derivative of each of the respective mixed signals and integrating the results of each time derivative comprises successively solving the following algebraic expressions:

$$Y_i = X_i - X_{i-1},$$

$$Z_i = Y_i + K \cdot T_s \cdot Z_{i-1}$$

where K is a gain constant, $T_s$ is the sample time interval, $X_i$ is the signal stream, and $Z_i$ is the original signal less any constant terms.

6. The method according to claim 5, wherein the constant $K \cdot T_s$ is in the range of 0.9 to 1.

7. A method of canceling DC offset in an RF receiver having a direct converter for direct down conversion of a received RF signal to a baseband signal, the method comprising:
taking a time derivative of signals in respective in-phase and quadrature-phase signal paths of the direct converter; and
integrating the results of the derivative to obtain the received signal without any constant offset value, wherein taking a time derivative of the each of the respective mixed signals and integrating the results of the time derivative comprises successively solving the following algebraic expressions:

$$Y_i = X_i - X_{i-1},$$

$$Z_i = Y_i + K \cdot T_s \cdot Z_{i-1}$$

where K is again constant, $T_s$ is the sample time interval, $X_i$ is the signal stream, and $Z_i$ is the original signal less any constant terms.

8. The method according to claim 7, wherein the constant $K \cdot T_s$ is in the range of 0.9 to 1.

9. A DC offset reduction block for a direct conversion circuit of an RF receiver comprising:
   circuitry adapted to take a time derivative of respective signals propagating through in-phase and quadrature phase signal paths of the direct conversion circuit; and
   circuitry adapted to integrate the results of the differentiation, thereby yielding respective I and Q components devoid of constant offset values, wherein taking a time derivative of the each of the respective mixed signals and integrating the results of the time derivative comprises successively solving the following algebraic expressions:

$Y_i = X_i - X_{i-1}$, $Z_i = Y_i + K \cdot T_s \cdot Z_{i-1}$ where K is again constant, $T_s$ is the sample time interval, $X_i$ is the signal stream, and $Z_i$ is the original signal less any constant terms.

10. The DC offset reduction block according to claim 9, wherein the constant $K \cdot T_s$ is in the range of 0.9 to 1.

11. A direct conversion IF converter comprising:
   an intermediate frequency, IF, filter adapted to filter the IF signal;
   an IF amplifier adapted to amplify the IF signal;
   a local oscillator producing a local oscillation signal having a frequency tuned to that of the IF signal;
   a first IF mixer along an in-phase channel path adapted to multiply a received radio frequency signal with the local oscillation signal;
   a second IF mixer along a quadrature-phase channel path adapted to multiply the received radio frequency signal with a 90° phase-shifted version of the local oscillation signal;
   a first low pass filter filtering an output of the first mixer thereby outputting a downconverted in-phase signal I, centered at baseband;
   a second low pass filter filtering an output of the second mixer thereby outputting a downconverted quadrature phase signal Q centered at baseband; and
   a residual DC correction circuit adapted to perform a time derivative and subsequent integration of the I and Q signals, wherein the time derivative and subsequent integration comprise solving the following algebraic expressions:

$Y_i = X_i - X_{i-1}$, $Z_i = Y_i + K \cdot T_s \cdot Z_{i-1}$ where K is a gain constant, $T_s$ is the sample time interval, $X_i$ is the signal stream, and $Z_i$ is the original signal less any constant terms.

12. The direct conversion IF converter according to claim 11, wherein the constant $K \cdot T_s$ is in the range of 0.9 to 1.

13. The direct conversion IF converter according to claim 11, wherein the DC correction circuit comprises programmable logic adapted to perform a DC correction algorithm.

14. The direct conversion IF converter according to claim 11, wherein the DC correction circuit comprises a set of mathematical operations performed on a processor.

* * * * *